May 3, 1960 W. L. CRAIG 2,935,438
PAPER AND METHOD OF MAKING SAME
Filed March 2, 1956 2 Sheets-Sheet 1

INVENTOR.
WILLIAM L. CRAIG
BY
his ATTORNEYS

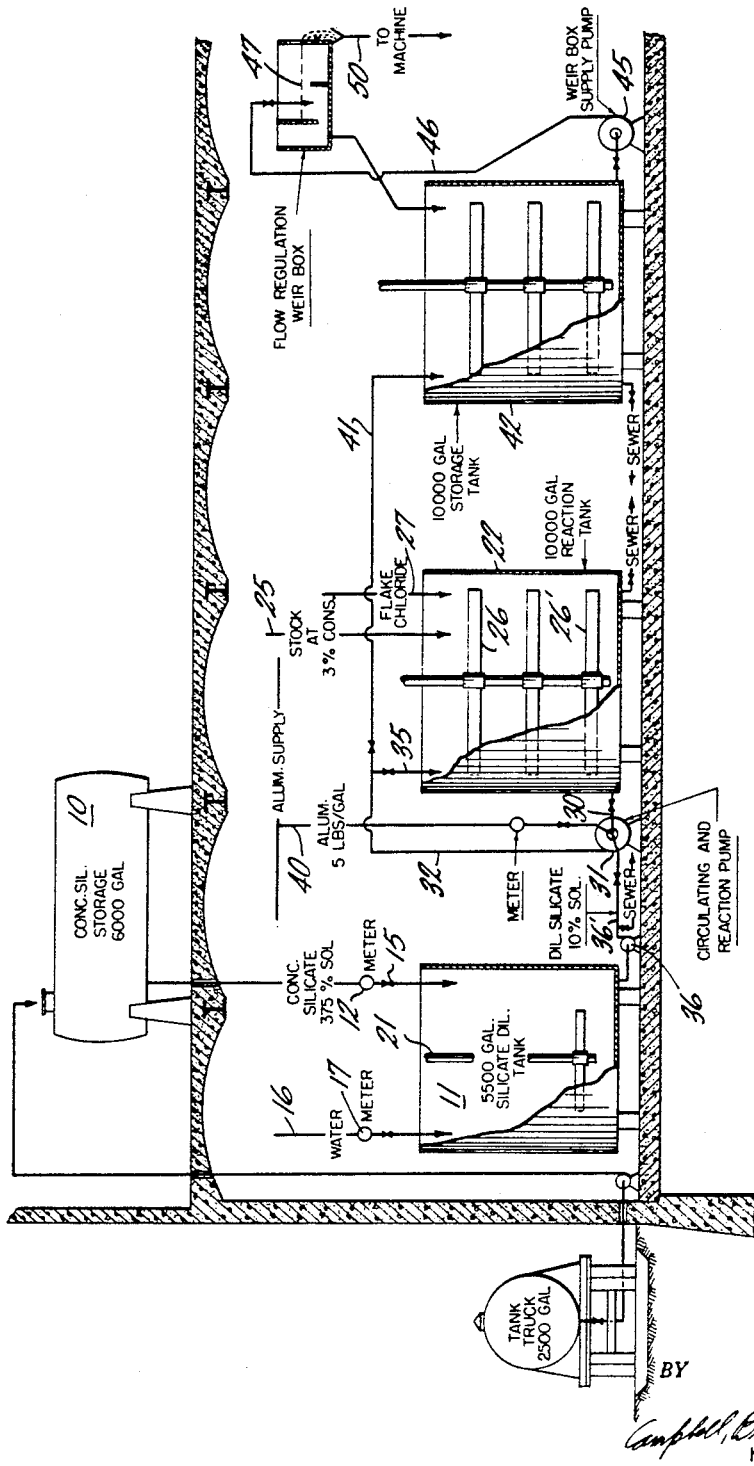

United States Patent Office 2,935,438
Patented May 3, 1960

2,935,438

PAPER AND METHOD OF MAKING SAME

William L. Craig, Westport, Conn., assignor to R. T. Vanderbilt Company, Inc., New York, N.Y., a corporation of New York Application March 2, 1956, Serial No. 569,130

9 Claims. (Cl. 162—181)

This invention relates to the manufacture of fillers and pigments which are useful in making paper.

Pigments and fillers which have been commonly used in the fields indicated include titanium dioxide and clay. The purpose of the additives is to provide greater volume or bulk in the product, improve opacity, provide brightness, color or desirable surface characteristics, or to strengthen the product. Although titanium dioxide may be useful as a pigment from one or more of these objectives, it is expensive, and a less expensive material which still has most or all of the properties of titanium dioxide and in some cases superior properties, but which is much less expensive, would be desirable. Clay, on the other hand, is a cheap material but generally does not provide the quality in the product which is desired.

An object of the invention is to make a material which can be used as a filler or pigment in the manufacture of paper which will impart improved physical and optical properties to the product and still be economical.

Another object of the invention is to provide a filler and pigment which will increase the volume or bulk of the product, which is generally a desirable property in the manufacture of paper.

Still another object of the invention is to prepare a filler and pigment which will impart to the product containing the filler or pigment opacity, brightness or color, which are important in the manufacture of paper, and also will afford a paper which has good surface smoothness and in absorption.

Still another object of the invention is to provide a filler and pigment which can be used with no substantial sacrifice in the strength of the end product and in some cases an improvement in the strength.

The foregoing objects of the invention are realized by reacting a precipitated hydrated calcium silicate, finely divided and not previously dried as described hereinafter, with a sulphate of aluminum, e.g., aluminum sulphate (which is commonly known as "alum" in the paper-making industry) in an aqueous medium at a concentration of at least about 1% so that at least about 50% of the calcium silicate is in the solid (undissolved) phase, preferably under conditions of intense agitation or shear such as are used in the manufacture of pigments, to form a finely divided insoluble reaction product of the calcium silicate and the sulphate of aluminum. The insoluble precipitate (when used without drying) is found to have a particular advantage in the manufacture of paper. It may be added, for example, to the pulp slurry at the fan pump or the beater, or some other point near the wet end of the machine, or it may be applied to the paper sheet using a size press or a calender stack or it may be incorporated in a coating composition which is applied to the paper sheet, and one or more of the advantages indicated above may be thereby obtained. The alum-treated calcium silicate is used in coating rawstock as well as in uncoated papers. Addition of a small percentage to the rawstock of a coated magazine grade paper has permitted reduction in basis weight while maintaining good opacity, bulk, tearing strength and printing quality. The high brightness of the pigment may permit substitution of unbleached for the bleached groundwood ordinarily used in this rawstock. The use of the alum-treated calcium silicate has been found advantageous in many grades of paper ranging from offset, bond, mimeo and book to newsprint, and also in various grades of paperboard. Since the cost of this new pigment is only a fraction of the cost of so-called high strength pigments, it may be used to replace "high strength pigments" at a considerable saving. At the same time it can produce equal opacity and printed show-through, higher brightness, greater bulk, better surface smoothness and greater ink receptivity. Accordingly, one embodiment of the invention is a paper sheet containing the calcium silicate-sulphate of aluminum reaction product.

The calcium silicate which is used as the starting material in the reaction has an average particle size not greater than about 2000 Angstrom units, most suitably 250 to 800 A., in diameter. In stating the particle size it is the diameter of the individual or discrete particles that are unattached to other particles, that is referred to. It may be prepared by interacting a soluble calcium salt such as calcium chloride and a soluble silicate such as sodium silicate in the substantial absence of cellulosic fibers in aqueous solution under high shear conditions that are used in the manufacture of pigments. One means which may be used to produce the desired conditions of high shear is a centrifugal pump. One of the solutions, either the calcium salt or the silicate, is added to the fluid stream of the other reactant passing through the centrifugal pump at a point as near as possible to the pump impeller, which is the locale of the condition of high shear. For example, the solution of calcium chloride may be passed through the pump in the normal manner and the solution of sodium silicate may be added to the calcium chloride stream near the pump impeller. Another example of a zone of high shear in which the reaction may be carried out is that produced near the inlet side of the beater roll of a pulp beater. Accordingly if it is desired, the calcium chloride solution, for example, may be placed in the beater and the sodium silicate solution added to the intake side of the beater roll while the beater is in operation. By maintaining the high shear conditions during the reaction between the silicate and the calcium salt, very fine particles of calcium silicate are produced, of the order of 500 A. average diameter, which are desirable for producing the calcium silicate-alum reaction product according to the invention. However, other methods may be employed for making the calcium silicate.

It is preferred to use a calcium silicate that has a high molar ratio of $SiO_2$ to $CaO$. This ratio is determined largely by the ratio of $SiO_2$ to $NaO$ in the sodium silicate that is used as a reactant to make the calcium silicate. There are many types of sodium silicate on the market which differ from each other in their molar ratio of $SiO_2$ to $Na_2O$ from 1:1 to 4:1. The most desirable properties of the pigment and filler of the invention are obtained by using a sodium silicate which has a ratio of $SiO_2$ to $Na_2O$ of at least about 3:1. The reaction proceeds substantially as follows:

$$CaCl_2 + Na_2O \cdot nSiO_2 + XH_2O \rightarrow CaO:mSiO_2:(H_2O)_x + 2NaCl$$

By using a sodium silicate in which $n$ is at least 3.0, the calcium silicate will have the preferred high ratio of $SiO_2$ to CaO of at least about 3.5, which is referred to as "$m$" in the empirical formula. "X," which designates the amount of combined water, is about 3.

The concentrations of the soluble calcium salt (e.g., $CaCl_2$) and the silicate (e.g., sodium silicate) are determined by the concentrations at which the precipitation of calcium silicate occurs. The concentration of the sodium silicate is generally below 30%, and the concentration of calcium chloride generally below 20%. It is preferred to maintain the concentration of sodium silicate in the approximate range 5 to 15% and the concentration of calcium chloride in the approximate range 5 to 15%, or equivalent concentrations of other soluble salts.

The reaction between the finely divided precipitated hydrated calcium silicate (which may be prepared by the foregoing procedure) at a concentration of at least about 1% by weight so that at least 50% is in the solid phase, with the sulphate of aluminum, which constitutes the subject matter of the invention, is preferably carried out in a zone of high shear as in the case of the calcium salt-soluble silicate reaction previously described. A zone of high shear is that which is produced near the impeller of a centrifugal pump or near the intake side of the roll of a pulp beater. By conducting the reaction in the zone of vigorous agitation, particles of average diameter below about 2000 Angstrom units may be obtained. Preferably the particles have average diameters in the range of 250 to 800 A. In stating the particles sizes, again it is the diameter of the individual or discrete particles that is referred to.

Figure 2 is a schematic flow diagram of a plant which may be used to manufacture the pigments and fillers of the invention.

EXAMPLE 1

Figure 1:
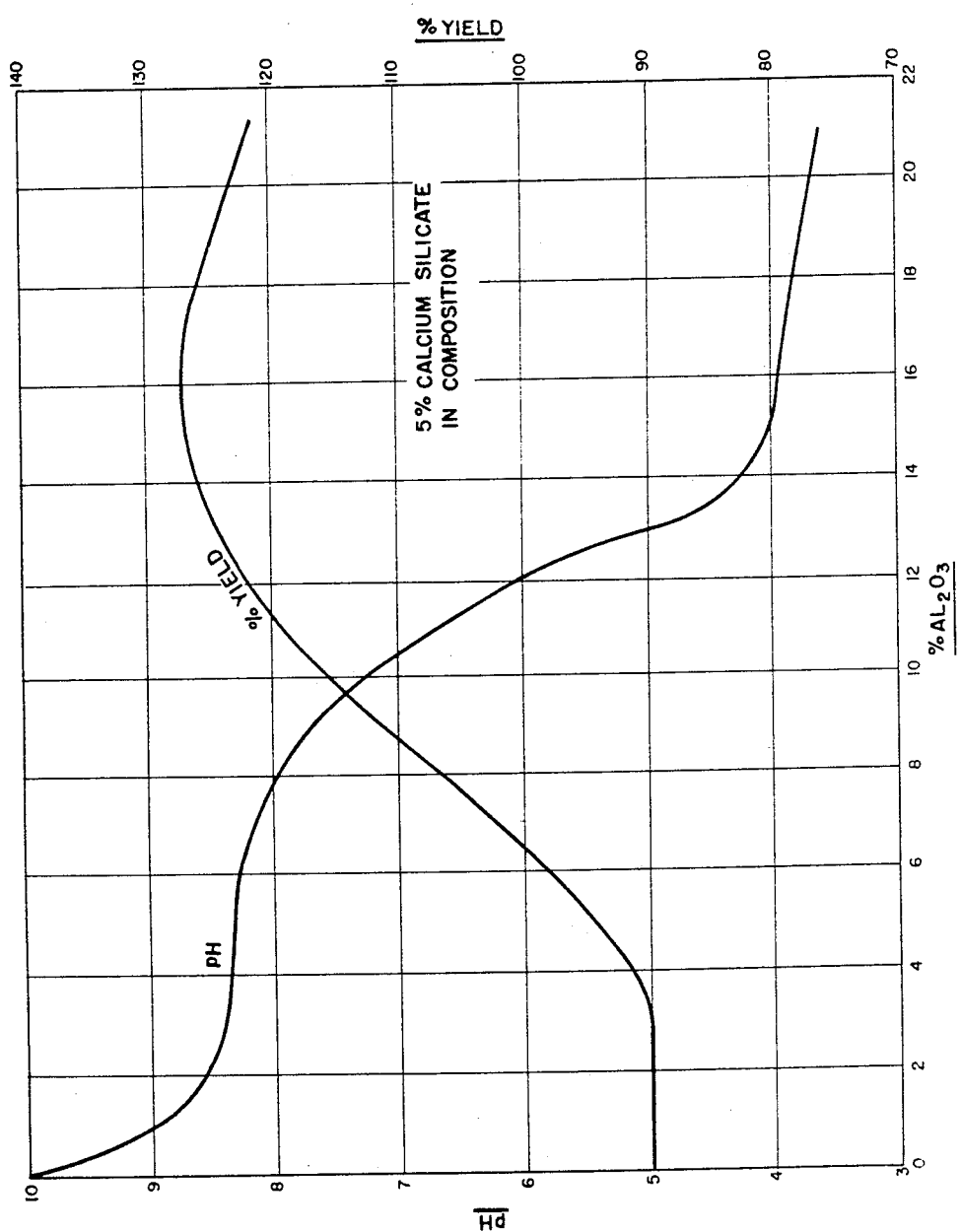
Figure 1 is a graph showing the variation in pH and yield of product with the amount of sulphate of aluminum added, expressed as percent $Al_2O_3$.

The effect of the addition of the alum to the calcium silicate on the pH and the yield of reaction product are evaluated graphically and by tabulated data by the following procedure. 20 grams of a freshly prepared precipitated hydrated calcium silicate slurry (bone dry basis) having a molar ratio of $SiO_2$ to CaO of about 4:1 are carefully added to a sufficient quantity of distilled water to produce a 10% slurry of bone dry calcium silicate. The calcium silicate is then dispersed for 5 minutes by a variable speed mixer, using a stainless steel paddle. This dispersion is carried out at as high a speed as possible in order to obtain complete mixing with no loss due to splashing. The appropriate volume of a 20% solution of aluminum sulphate (17.25% $Al_2O_3$) is then added by pipette to the calcium silicate dispersion while it is still under agitation. The treated dispersion is allowed to stir for 10 minutes, after which sufficient distilled water is added to produce a total volume of 400 ml. and a 5% suspension of calcium silicate. After further stirring for 30 seconds, the pH is taken. Both the paddle and the electrodes of the pH meter are then carefully washed with as little distilled water as possible. The treated calcium silicate dispersion is carefully transferred quantitatively to a Büchner funnel containing a #5 filter paper of known bone dry weight. After filtering, the wet cake and filter paper are carefully removed and dried to bone dryness in an oven at 105° C. The bone dry weight of the cake is determined and the percent yield of reaction product calculated and plotted, together with the pH value, against the corresponding percent $Al_2O_3$ equivalent of the aluminum sulphate added. The results are presented in Table 1.

Table 1

| Percent $Al_2O_3$ | Iron-Free Aluminum Sulphate (17.25% $Al_2O_3$) 20% Solution, Gm. | pH | Weight of Product (B.D.) | Percent Yield |
|---|---|---|---|---|
| 0 | 0 | 10.1 | 18 | 90 |
| 1.5 | 1.7 | 8.7 | 18 | 90 |
| 3 | 3.5 | 8.4 | 18 | 90 |
| 6 | 7.0 | 8.3 | 20 | 98 |
| 9 | 10.0 | 7.7 | 22 | 111 |
| 12 | 14.0 | 7.0 | 24 | 122 |
| 13.5 | 16.0 | 4.4 | 25 | 125 |
| 15 | 17.0 | 4.0 | 25 | 127 |
| 18 | 21.0 | 3.8 | 25 | 126 |
| 21 | 24.0 | 3.6 | 24.5 | 122 |

The tabulated results are plotted graphically in Figure 1.

It will be seen from the data in Table 1 and Figure 1 that while the pH, as would be expected is depressed by the addition of the aluminum sulphate, the increase in yield of product is unexpected since ordinarily it would be expected that the aluminum sulphate would dissolve at least some of the slightly soluble calcium silicate. Thus, when only 1% $Al_2O_3$ based on the calcium silicate has been added, the pH has dropped from about 10 to below 9, while the yield of product has remained substantially constant, thereby indicating that the reaction between the aluminum sulphate and the calcium silicate has taken place to a measurable degree. A more marked increase in yield begins to take place when the amount of aluminum sulphate added, expressed as percent $Al_2O_3$ has reached 4%, corresponding with a drop in pH to about 8.4. In the higher ranges of aluminum sulphate addition, the yield of product is still substantially above 100% at 21% $Al_2O_3$ and above, which corresponds with a pH of about 3.5 to 4, indicating that even with larger amounts of alum and at the very acid pH's, the reaction product of the calcium silicate and the alum is stable. The product (before drying) may be added to paper at the paper machine as an effective filler or pigment, e.g., into the pulp slurry, in the amount of 1 to 25% of the pulp fibers.

It is thought that the desired reaction between sulphate of aluminum and calcium silicate takes place while the calcium silicate in the liquid suspension is in the solid phase, thereby producing a reaction product which, unlike aluminum silicate, possesses the desirable properties described above, particularly for paper manufacture, as well as insolubility; whereas aluminum silicate, although it may be insoluble, has little or none of the desired properties. Hence, if the calcium silicate reactant contains predominantly the solid phase, the reaction product with sulphate of aluminum will exhibit the dominant characteristics of the desired product, while if the reaction is predominantly between ions of the sulphate of aluminum and the silicate, the product will be predominantly the undesired aluminum silicate. The temperature (which is preferably normal temperatures, 20 to 25° C.) and the concentration of the calcium silicate suspension are controlled to effect the desired concentration of solid calcium silicate in the reactant. It has been found that the interaction between the calcium silicate and the sulphate of aluminum may be effected at ordinary temperatures in concentrations above about 1%. Although the theory presented is believed to be a logical one, it is not intended to limit the invention to this nor any other theory.

A sufficient amount of sulphate of aluminum is added to produce the reaction product with the calcium silicate, generally about 1 to 25%, preferably about 4 to 20%, expressed as equivalent $Al_2O_3$, based on the weight of calcium silicate. Other forms of sulphate of aluminum such as the aluminum alums, i.e., ammonium alum (the mixed sulphate of aluminum and ammonium), potassium alum (the mixed sulphate of aluminum and potassium) and sodium alum (the mixed sulphate of aluminum and sodium) may be used instead of the aluminum sulphate. Although the desired reaction may be brought about by using solid powdered crystalline aluminum sulphate, it is preferred to employ an aqueous solution of aluminum sulphate.

In the foregoing presentation, there has been described only the use of preformed sulphates of aluminum. However, the sulphate of aluminum, instead of being preformed, may be synthesized in the presence of the calcium silicate. This may be done by adding an amount of sodium aluminate ($NaAlO_2$) or aluminum hydroxide having an equivalent $Al_2O_3$ content within the ranges described above and then adding an acidic sulphate material such as sulphuric acid, to convert the sodium aluminate to aluminum sulphate. The amount of acid sulphate material added may be regulated by adjusting the pH to a value within the ranges described herein.

The advantages of the invention may be realized by adding the aluminum sulphate-calcium silicate reaction product to pulp fibers at some phase in the manufacture of paper. This applies to any type of fibers which are useful in the manufacture of paper. The amount of reaction product added, in terms of bone dry aluminum sulphate-calcium silicate reaction product, is an amount conventionally used as a filler or pigment in the manufacture of paper, generally at least 1%, frequently 5 to 25%, based on the weight of bone dry paper fibers. The advantages of using the reaction product of the invention as a paper filler or pigment, as contrasted with the conventional use of aluminum sulphate as an additive directly to the pulp slurry, for example in the beater, is illustrated by the following comparative example.

EXAMPLE 2

A 40-gram batch of precipitated hydrated calcium silicate is prepared by the following procedure. 36.2 grams of sodium silicate having a molar ratio of 3.38 $SiO_2$:1$Na_2O$ is dissolved in water to a concentration of 10% and heated to 170° F. A second solution, of 12.7 grams anhydrous $CaCl_2$ and 114.3 grams of distilled water is prepared, resulting in a 10% aqueous calcium chloride solution. This is heated to 150° F. The calcium chloride solution is added to a Waring Blendor, which is started, and the hot silicate solution is added slowly through a separatory funnel, to cause the precipitation of the calcium silicate. The agitation is continued for 5 minutes after all of the sodium silicate has been added. Sufficient water is added (250 ml.) to produce a fluid mass. The solids content of the mixture is determined by measuring out two 50 ml. portions, filtering and washing with an approximately equal volume of water. The filter paper is dried under an infra-red lamp and the bone dry solids content is determined as 5.75%.

A master batch of bleached Weyerhauser pulp stock is made, having a consistency of 0.33% by diluting a stock solution having a freeness of 370 ml. Canadian and a consistency of 2.8%, in 72,000 cc. of distilled water. Three 6050 ml. portions of this master batch are then measured out and diluted accurately to 8,000 ml. in a pail, so as to have a consistency of 0.25%. These furnishes, containing no size nor alum, are treated in the following manner.

*Test No. 1.*—139 ml. of calcium silicate slurry (pH 9.9, containing 8.0 grams of bone dry calcium silicate) are added to the Waring Blendor, plus a small additional amount of water used to clean the graduate. 56 cc. of a 10% aluminum sulphate solution (11% $Al_2O_3$ based on the calcium silicate) are added through the separatory funnel and mixed for 5 minutes. The pH of the mixture is then 6.8. Nine more ml. of the 10% aluminum sulphate solution are added and mixed for one minute, thereby reducing the pH to 4.4. The amount of alum added to this point, based on the calcium silicate is equivalent to 13.5% $Al_2O_3$, and the concentration of calcium silicate based on the total weight of the system is 5%. The acid calcium silicate is then diluted to 500 ml. and added to one 8,000 ml. portion of the furnish. An additional 100 ml. is added to flush the graduate. After mixing the filled stock for approximately 5 minutes, the pH is measured and found to be 5.4. Six sheets are then made, using 500 cc. of the filled stock for each sheet. Each 5 cc. portion is diluted to 7200 cc. in the handsheet mold according to standard TAPPI procedure. The wire of the handsheet mold is cleaned for each trial. The pH of the stock in the mold is 6.6. The sheets are pressed at 50 pounds per square inch for 5 minutes, and then dried in rings in a constant humidity room (70° F., 50% R.H.).

*Test No. 2.*—139 ml. of the calcium silicate suspension are added to a second 8,000 cc. portion of the stock of 0.25% consistency and to this furnish are then added, with agitation, 65 cc. of 10% aluminum sulphate solution at which time the concentration of calcium silicate is about 0.93% by weight. Sufficient water is used to wash both graduates, so as to have a total of 8600 ml. The pH is 5.7 after mixing for 5 minutes. 500 cc. of the furnish are used for each of 6 handsheets, prepared by the standard TAPPI procedure referred to in test No. 1. The pH in the mold is 6.8, the wire of the mold being cleaned before each trial. The formed sheets are treated as in test No. 1.

*Test No. 3.*—139 ml. of the calcium silicate suspension are added to 8,000 ml. of the 0.25% stock and sufficient distilled water is added to produce a total volume of 8600 ml. The pH of the mixture is 10.3 after mixing for 5 minutes. 500 cc. of the furnish are used to prepare each of six handsheets, which are diluted to 7200 cc. in the mold according to the standard TAPPI procedure. There is added 3.8 cc. of a 10% aluminum sulphate solution in the mold, which is equivalent to the 65 cc. of 10% aluminum sulphate added to the 8600 cc. of stock solution in tests Nos. 1 and 2. The pH in the mold is 6.9, and the concentration of calcium silicate is about 0.0083% by weight.

Measurements are made on brightness (G.E.), opacity (B. & L.) corrected to the weight of the sheet by the Kubelka and Munk theorem, basis weight (25 x 38–500), bulk, and percent total ash. The results of these tests are summarized in the following table.

*Table 2*

|  | Test No. 1 | Test No. 2 | Test No. 3 |
|---|---|---|---|
| G. E. Brightness | 86.9 | 87.4 | 86.6 |
| Ratio Brightness/Total Ash | 9.7 | 8.3 | 8.3 |
| B. & L. Opacity | 84.7 | 84.7 | 84.1 |
| Opacity Corrected to Weight by Kubelka & Munk Theorem (45#) | 84.8 | 84.1 | 83.5 |
| Ratio Opacity/Total Ash | 9.4 | 7.9 | 8.0 |
| Basis Weight (25 x 38–500) | 44.7 | 46.0 | 46.4 |
| Bulk (Points per Pound×10⁴) | 950 | 930 | 926 |
| Percent Total Ash | 9.0 | 10.6 | 10.4 |
| pH Values: |  |  |  |
| Pigment | 4.4 | 9.9 | 9.9 |
| Furnish | 5.4 | 5.7 | 10.3 |
| Handsheet Mold | 6.6 | 6.8 | 6.9 |

The data in Table 2 show that, based on the comparable ash content (which is a measure of the amount of pigment present), the paper sheet containing the pigment prepared at the higher concentrations of calcium silicate and in the absence of the paper fibers has a substantially superior brightness and opacity as compared with the paper containing the calcium silicate pigment which is treated with aluminum sulphate at high dilutions and in the presence of the pulp fibers.

If the calcium silicate is dried before being treated with the sulphate of aluminum, it ordinarily will agglomerate to a particle size substantially above 2000 A., and thereby suffer a loss in desired properties. The calcium silicate may be dried and the agglomeration may be avoided however, if the calcium silicate which is reacted with the aluminum sulphate contains, prior to drying, a certain amount of pulp fibers, e.g., hydrated pulp (as disclosed and claimed in my copending application Serial No. 394,485, now Patent No. 2,823,997), or a certain amount of starch, e.g., hydrolyzed starch (as disclosed and claimed in my copending application Serial No. 382,193, now Patent No. 2,824,099). When a substantial amount of pulp fibers are used in accordance with the Patent No. 2,823,997, as previously noted the pigment contains the calcium silicate-aluminum sulphate reaction product not only on the surface of the fibers but also in the interstices of the fibers. Moreover, as previously indicated, the present invention is directed to carrying out the reaction in the substantial absence of any pulp fibers and starch, so that in the reaction product the particles of calcium silicate-aluminum sulphate reaction product are substantially entirely on the surface of the pigment fibers.

As an indication of the chemical composition of the calcium silicate that has been treated with aluminum sulphate in accordance with the present invention ignition tests have been carried out on the pigment which contains starch in accordance with the Patent No. 2,824,099. The ignition tests were carried out on two samples, one of which consisted of the calcium silicate starch complex, and the second which was prepared by treating the latter with aluminum sulphate. The properties of the product prepared according to the present invention, i.e. in the substantial absence of starch or cellulosic fibers are reflected by the same proportions of ingredients as shown in Table 3 minus a small amount which is attributable to the starch.

Table 3

| | Untreated | Alum-treated |
|---|---|---|
| | Percent | Percent |
| Loss at 105° C | 8.38 | 17.03 |
| Loss on ignition | 25.99 | 38.59 |
| SiO₂ | 56.36 | 41.64 |
| | 0.31 | |
| B₂O₃ | | 8.69 |
| Al₂O₃ | | 0.04 |
| Fe₂O₃ | 14.16 | 12.25 |
| CaO | 0.07 | 0.26 |
| MgO | | 13.70 |
| Sulfur as SO₃ | 1.72 | 0.35 |
| Chlorides as Cl | 3.72 | 3.17 |
| Molecular ratio, SiO₂:CaO | | |

The data in the table show that the product formed by the interaction between the solid phase calcium silicate and alum contains the calcium oxide and silicon dioxide of the calcium silicate, as well as the Al₂O₃ and the sulphate of the alum, and therefore is not merely a product of methathesis of aluminum sulphate and calcium silicate, i.e., aluminum silicate.

The following is a description of how the process of the invention may be carried out on a plant scale, using a batch technique designed to produce about 2.5 tons of calcium silicate-alum reaction product. The method described, which is for the preparation of a fibrous filler, applies equally well with suitable modification of the quantities, etc., to the manufacture of pigments or fillers in which the fibers are replaced with starch, or in which neither starch nor fibers are used.

EXAMPLE 3

The following weights and volumes of chemicals are used:

| Material | Weight, pounds | Volume, gallons |
|---|---|---|
| Fiber (Virgin Chemical or Broke) 1,000 Pounds at 3% Consistency | 33,333 | 3,990 |
| Calcium Chloride (78.5% Commercial) | 1,615 | 112 |
| Sodium Silicate (37.5%) | 9,660 | 833 |
| Dilution Water for Silicate (37.5%–10%) | 26,657 | 3,190 |
| Alum (2,500 pounds at 5 pounds per gallon) | 6,620 | 500 |
| Total | 77,885 | 8,625 |

The 833 gallons of concentrated sodium silicate are transferred from the concentrated silicate storage tank 10 of Figure 2 to the silicate dilution tank 11 through the meter 12 and the valve 15 at the rate of approximately 40 gallons per minute. 3190 gallons of dilution water are then added to the tank 12 through the pipe 16, the meter 17 and the valve 20 at the rate of approximately 100 gallons per minute. The silicate is diluted and mixed by the agitator 21 in the tank 11 or by a "Lightnin" mixer or similar type mixer, as desired. After the solution has been mixed for 5 minutes, it is ready for use.

The 3% stock solution from the beater not shown is added to the reaction tank 22 through the pipe 25 and is agitated by a vertical paddle agitator 26 having several arms equally spaced between the bottom and top of the tank. One set of arms 26' is preferably placed relatively close to the bottom of the tank 22 to allow agitation of the stock-chloride mixture prior to the reaction. 16 bags containing 1650 pounds of 78.5% commercial calcium chloride are then added to the reaction tank 22 as indicated at 27, while continuously stirring the mixture with the agitator 26. The mixture is circulated through the pipe 30, the pump 31, the pipe 32 and the return line 35, while agitating for 35 minutes. During the reaction between the calcium chloride and the fibers, the temperature is maintained at 25° C. At this point the reaction between the calcium chloride and the sodium silicate may be carried out. Accordingly, the diluted sodium silicate is pumped through the pump 36 to an auxiliary inlet port near the impeller of the pump 31 in the zone of high shear. The pump 31 has a capacity capable of delivering at least 400 g.p.m. of 3% stock slurry. Since it is preferred to obtain as much reaction as possible between the sodium silicate and the calcium chloride in the zone of high shear in the pump 31, and this condition may be brought about most readily using high ratios of normal flow through the pump (i.e., through the pipes 30 and 32) to the auxiliary flow added through the pipe 36', it is preferred to maintain the volume ratio of flows through the pump 31 at least about 6.5:1, e.g. 6.7:1. After an interval, usually about 5 minutes, has been allowed for the reaction of the sodium silicate and calcium chloride, the 500 gallons of aluminum sulphate solution is added to the pump 31 through the pipe 40 while continuously recirculating the calcium silicate-pulp slurry through the pipes 30, 32 and 35 and the pump 31. The point at which the pipe 40 is tied in with the inlet of the pump 31 is also as close as possible to the pump impeller so that the reaction between the aluminum sulphate and the calcium silicate will take place in the zone of high shear adjacent the impeller of the pump. The aluminum sulphate solution is added through the pipe 40 at the rate of about 17 g.p.m. while circulating the calcium silicate-pulp slurry at the rate of about 400 g.p.m. so that the time of reaction between the aluminum sulphate and calcium silicate is about 30 minutes. The product is then pumped through the pipe 41 to the agitated storage tank 42. From there it is pumped through the weirbox supply pump 45, and the pipe 46 to weirbox 47. From the weirbox 47 the fibrous filler or other calcium silicate-alum pigment slurry is distributed to the paper machine through the pipe 50 as desired.

Although specific embodiments of the invention have been described, it will be apparent that there are many modifications and equivalents within the teaching of the specification, and accordingly it is intended that all modifications and equivalents be included within the scope of the appended claims.

This application is a continuation-in-part of my copending applications Serial No. 382,193, filed September 24, 1953, now Patent No. 2,824,099, and Serial No. 394,485, filed November 25, 1953, now Patent No. 2,823,977.

I claim:
1. The method of producing a paper sheet containing pulp fibers which comprises reacting in an aqueous medium with vigorous agitation and in the substantial absence of cellulosic fibers, a soluble calcium salt and a soluble silicate to form a finely-divided precipitate of calcium silicate, reacting said precipitate without drying with a sulphate of aluminum in the amount of at least 1% by weight of $Al_2O_3$ based on the calcium silicate and adding said reaction product without drying to pulp fibers in an amount which will improve the properties of paper made from the pulp, and producing a paper sheet from said pulp fibers.

2. The method of claim 1 wherein the reaction product is added to a pulp slurry and paper is subsequently made from said pulp slurry.

3. The method of claim 1 in which the concentration of the calcium silicate precipitate is at least about 1% when it is reacted with the sulphate of aluminum.

4. The method of claim 3 in which the molar ratio of $SiO_2$ to CaO in the calcium silicate is at least about 3.5:1, the reaction between the calcium silicate and the sulphate of aluminum is carried out in a zone of vigorous agitation, and the average diameter of the particles of calcium silicate and of the particles of calcium silicate-sulphate of aluminum reaction product are not greater than about 2000 Angstrom units.

5. The method of claim 4 in which the sulphate of aluminum is aluminum sulphate and the amount used is about 4 to 20% of the weight of the calcium silicate, expressed as percent $Al_2O_3$.

6. The method of claim 4 in which the average particle size of the calcium silicate is in the approximate range 250 to 800 Angstrom units.

7. The method of producing a paper sheet containing pulp fibers which comprises reacting in an aqueous medium with vigorous agitation and in the substantial absence of cellulosic fibers, calcium chloride and sodium silicate to form a finely-divided precipitate of calcium silicate and sodium chloride in solution, reacting said precipitate in said aqueous medium containing said sodium chloride without drying with a sulphate of aluminum in the amount of at least 1 percent by weight of $Al_2O_3$ based on the calcium silicate, and adding said reaction product without drying to pulp fibers in an amount which will improve the properties of paper made from the pulp, and producing a paper sheet from said pulp fibers.

8. A paper sheet comprising a web of cellulose fibers and a pigment prepared by reacting calcium silicate with a sulphate of aluminum in liquid medium with intense agitation, the particles of said pigment having an average particle size not greater than about 2000 Angstrom units, said particles being substantially entirely on the surface of said fibers, the molecular ratio of $SiO_2$ to CaO in said calcium silicate being at least 3.5 to 1.

9. A paper sheet as described in claim 8 wherein the sulphate of aluminum is aluminum sulphate and the amount thereof is 4 to 20% by weight based on the weight of the calcium silicate.

References Cited in the file of this patent

UNITED STATES PATENTS

| | | |
|---|---|---|
| 2,583,548 | Craig | Jan. 29, 1952 |
| 2,599,091 | Craig | June 3, 1952 |
| 2,599,092 | Craig | June 3, 1952 |
| 2,599,093 | Craig | June 3, 1952 |
| 2,599,094 | Craig | June 3, 1952 |
| 2,694,633 | Pattilloch | Nov. 16, 1954 |

UNITED STATES PATENT OFFICE
CERTIFICATE OF CORRECTION

Patent No. 2,935,438                May 3, 1960

William L. Craig

It is hereby certified that error appears in the printed specification of the above numbered patent requiring correction and that the said Letters Patent should read as corrected below.

Column 2, line 60, for "NaO" read -- $Na_2O$ --; column 6, line 7, for "5 cc." read -- 500 cc. --; column 8, line 75, for "2,823,977" read -- 2,823,997 --.

Signed and sealed this 27th day of September 1960.

(SEAL)
Attest:

KARL H. AXLINE
Attesting Officer

ROBERT C. WATSON
Commissioner of Patents